(12) United States Patent  (10) Patent No.: US 8,118,701 B2
Okabe et al.  (45) Date of Patent: Feb. 21, 2012

(54) OUTBOARD MOTOR

(75) Inventors: Yoshihiko Okabe, Shizuoka (JP); Hirotoshi Yamauchi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 524 days.

(21) Appl. No.: 12/365,283

(22) Filed: Feb. 4, 2009

(65) Prior Publication Data

US 2009/0203491 A1  Aug. 13, 2009

(30) Foreign Application Priority Data

Feb. 8, 2008 (JP) ................................. 2008-028852

(51) Int. Cl.
*F16H 57/08* (2006.01)
*B63H 20/14* (2006.01)

(52) U.S. Cl. ......................................... 475/331; 440/75

(58) Field of Classification Search .................. 475/269, 475/330, 296, 331, 204; 440/75, 86
See application file for complete search history.

(56) References Cited

U.S. PATENT DOCUMENTS

| | | | | |
|---|---|---|---|---|
| 4,129,050 A | * | 12/1978 | Akashi et al. | 475/327 |
| 5,910,063 A | * | 6/1999 | Kato | 475/159 |
| 2007/0197340 A1 | * | 8/2007 | Kim et al. | 475/344 |
| 2008/0153656 A1 | * | 6/2008 | Nerstad et al. | 475/331 |
| 2009/0181585 A1 | * | 7/2009 | Fukuoka et al. | 440/88 L |
| 2009/0203492 A1 | * | 8/2009 | Okabe | 475/331 |

FOREIGN PATENT DOCUMENTS

| EP | 1 902 943 A1 | 3/2008 |
|---|---|---|
| WO | 2007/007707 A1 | 1/2007 |

OTHER PUBLICATIONS

Okabe et al.; "Outboard Motor"; U.S. Appl. No. 12/365,277, filed Feb. 4, 2009.

* cited by examiner

*Primary Examiner* — Roger Pang
(74) *Attorney, Agent, or Firm* — Keating & Bennett, LLP

(57) ABSTRACT

In an outboard motor, a speed reduction mechanism includes an inner gear connected with an input shaft (i.e., second output shaft), a planetary gear that meshes with the inner gear and that rolls inside the inner gear, and a sun gear that meshes with the planetary gear and that is not rotatable. A shaft portion of a carrier that supports the planetary gear, and a shaft core portion of the sun gear, preferably have a cylindrical or substantially cylindrical shape. The shaft portion of the carrier is inserted and arranged to overlap with the shaft core portion of the sun gear in a direction perpendicular or substantially perpendicular to the shaft. The output shaft (i.e., drive shaft) is inserted and coupled to the shaft portion of the carrier. Accordingly, this provides an outboard motor that makes it possible to prevent the size of a speed change device from increasing in size when a speed reduction mechanism is added.

4 Claims, 6 Drawing Sheets

OUTBOARD MOTOR

BACKGROUND OF THE INVENTION

1. Field of the Invention

The present invention relates to an outboard motor having a speed change device that changes the rotational speed of an engine and transmits power to a propeller.

2. Description of the Related Art

An outboard motor having a speed change device that changes the rotational speed of an engine and transmits power to a propeller is known. For example, WO 2007/007707 discloses an outboard motor that has a planetary gear speed change mechanism that changes the rotational speed of an engine between a high speed range and a low speed range and a forward-and-reverse change mechanism that changes the rotational direction of the engine among forward, neutral, and reverse.

In such a speed change device, adding a speed reduction mechanism to an output side of the speed change device has been considered to stabilize and transmit engine power to a propeller.

However, simply adding the speed reduction mechanism to the conventional speed change device makes the dimension of the speed change device in an axial direction larger, and accordingly, the increased size of the entire outboard motor becomes a problem.

SUMMARY OF THE INVENTION

In view of the problems described above, preferred embodiments of the present invention provide an outboard motor that prevents the size of a speed change device from increasing even when a speed reduction mechanism is added.

A first preferred embodiment of the present invention provides an outboard motor including an engine that generates power, and a speed change device that changes a rotational speed of the engine and transmits power to a propeller. The speed change device has a speed reduction mechanism that reduces a rotational speed of an input shaft and transmits power to an output shaft, the speed reduction mechanism including an inner gear that is connected with the input shaft, a planetary gear that meshes with the inner gear and that rolls inside the inner gear, and a sun gear that meshes with the planetary gear and that is not rotatable, a shaft portion of a carrier that supports the planetary gear and a shaft portion of the sun gear having a cylindrical or substantially cylindrical shape, the shaft portion of the carrier is inserted and located to overlap with the shaft portion of the sun gear, and the output shaft is inserted and coupled to the shaft portion of the carrier.

A second preferred embodiment of the present invention includes a speed change device, in which the speed change device further has a speed change mechanism and a forward-and-reverse change mechanism, and the speed reduction mechanism is located closer to a propeller shaft than the speed change mechanism and the forward-and-reverse change mechanism, and closer to an engine than a bevel mechanism that couples the propeller shaft to the output shaft.

A third preferred embodiment of the present invention includes a speed change device in which the shaft portion of the carrier and the output shaft are coupled by spline-fitting so as to be concentrically arranged.

A fourth preferred embodiment of the present invention includes a speed change device in which the sun gear supports the shaft of the carrier and the output shaft through a bearing in order to permit rotation.

In the first preferred embodiment, a shaft portion of a carrier and a shaft portion of a sun gear preferably have a cylindrical or substantially cylindrical shape, the shaft portion of the carrier is inserted and located to overlap with the shaft portion of the sun gear, and an output shaft is inserted and coupled inside the shaft portion of the carrier, so that it is possible to shorten the length of the speed reduction mechanism in the axial direction and prevent the size of the entire outboard motor from increasing when the speed reduction mechanism is added.

In the second preferred embodiment, the speed reduction mechanism is located in a portion between the speed change mechanism and the forward-and-reverse change mechanism of the output shaft and the bevel mechanism, so that it is possible to locate the speed reduction mechanism by utilizing an empty portion of the output shaft and prevent the size of the entire outboard motor from increasing.

In the third preferred embodiment, the shaft portion of the carrier and the output shaft are coupled by spline-fitting to be concentrically arranged, so that, as in a case where the output shaft is fitted to the outer periphery of the shaft portion of the carrier, it is possible to prevent the radius of the output shaft from increasing more than necessary and to make a power transmission mechanism to a propeller side compact in size.

In the fourth preferred embodiment, the shaft portion of the carrier and the output shaft are pivotally supported by the sun gear, so that it is possible to further shorten the length of the speed reduction mechanism in the axial direction.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings.

Figure 1:
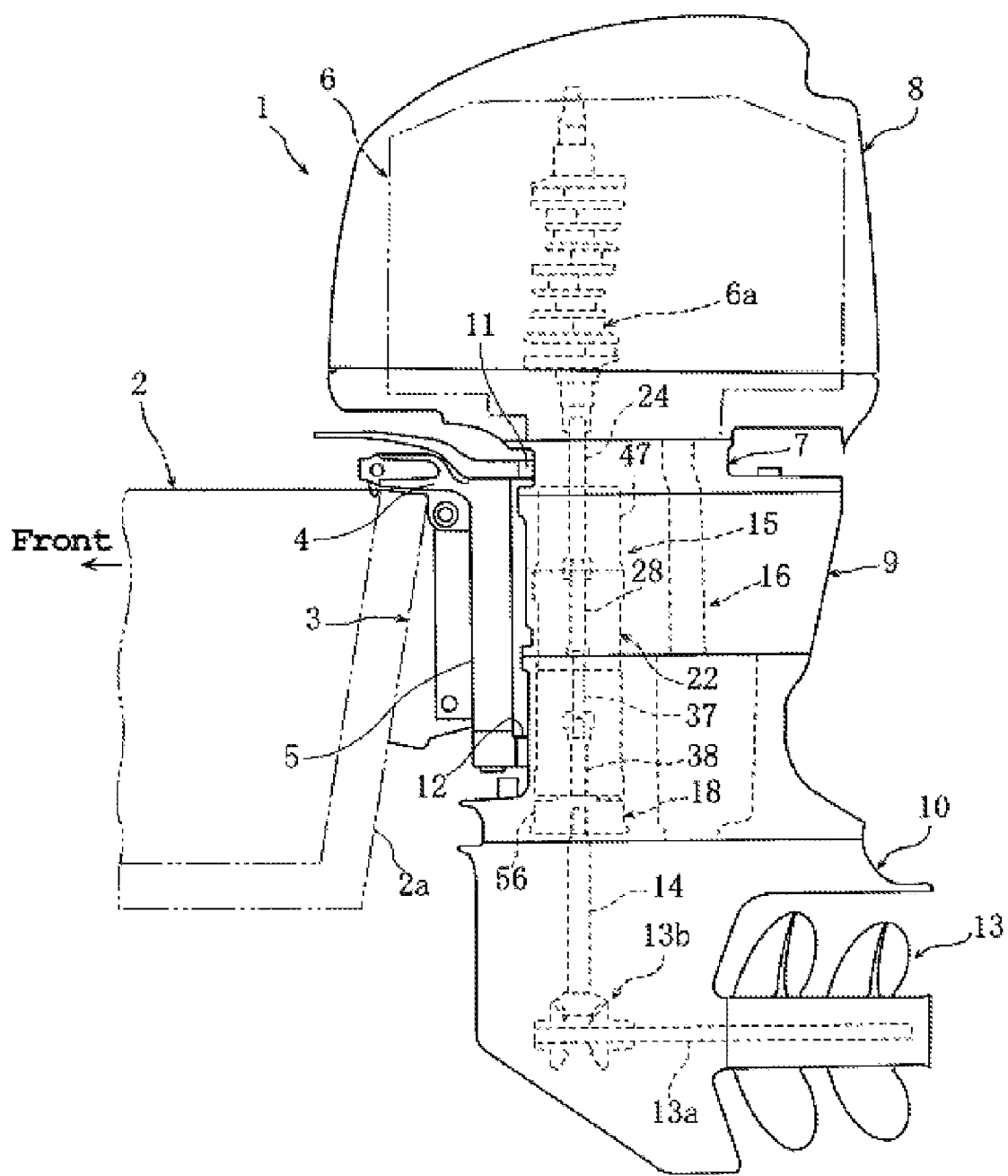
FIG. 1 is a side view of an outboard motor having the speed change device according to a preferred embodiment of the present invention.
Figure 2:
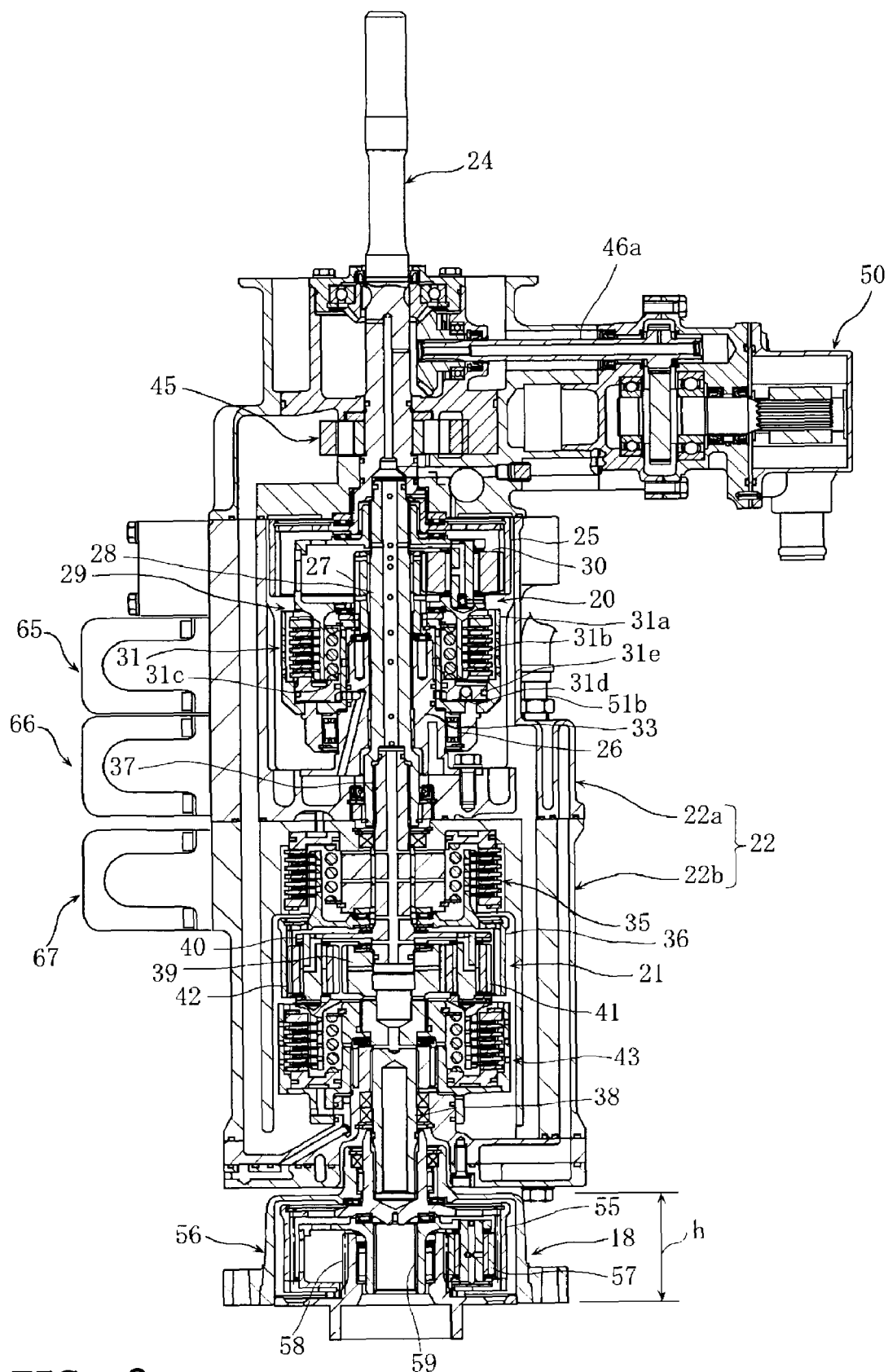
FIG. 2 is a cross-sectional back view of a speed change device according to a preferred embodiment of the present invention.
Figure 3:
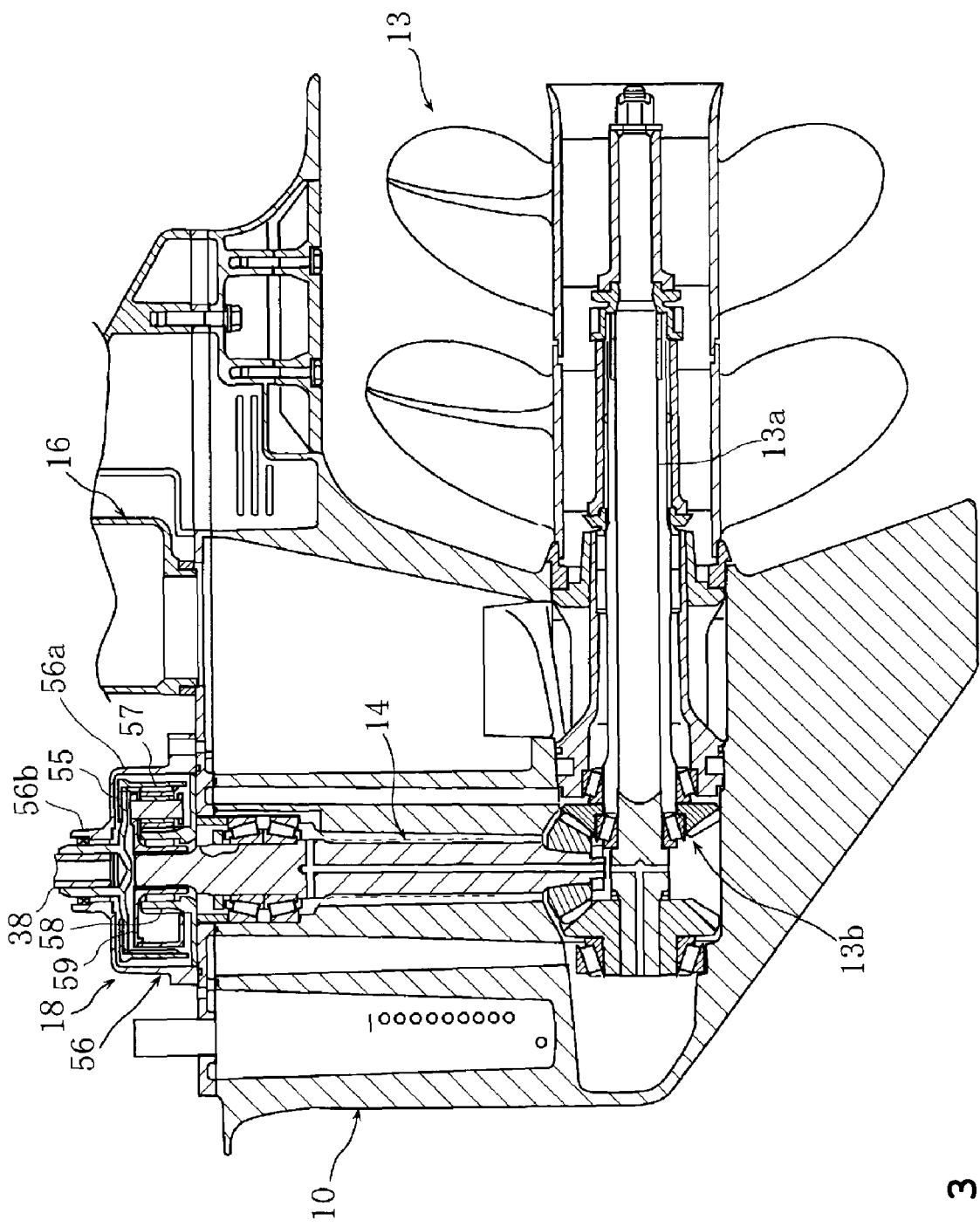
FIG. 3 is a cross-sectional view of a lower case of an outboard motor according to a preferred embodiment of the present invention.
Figure 4:
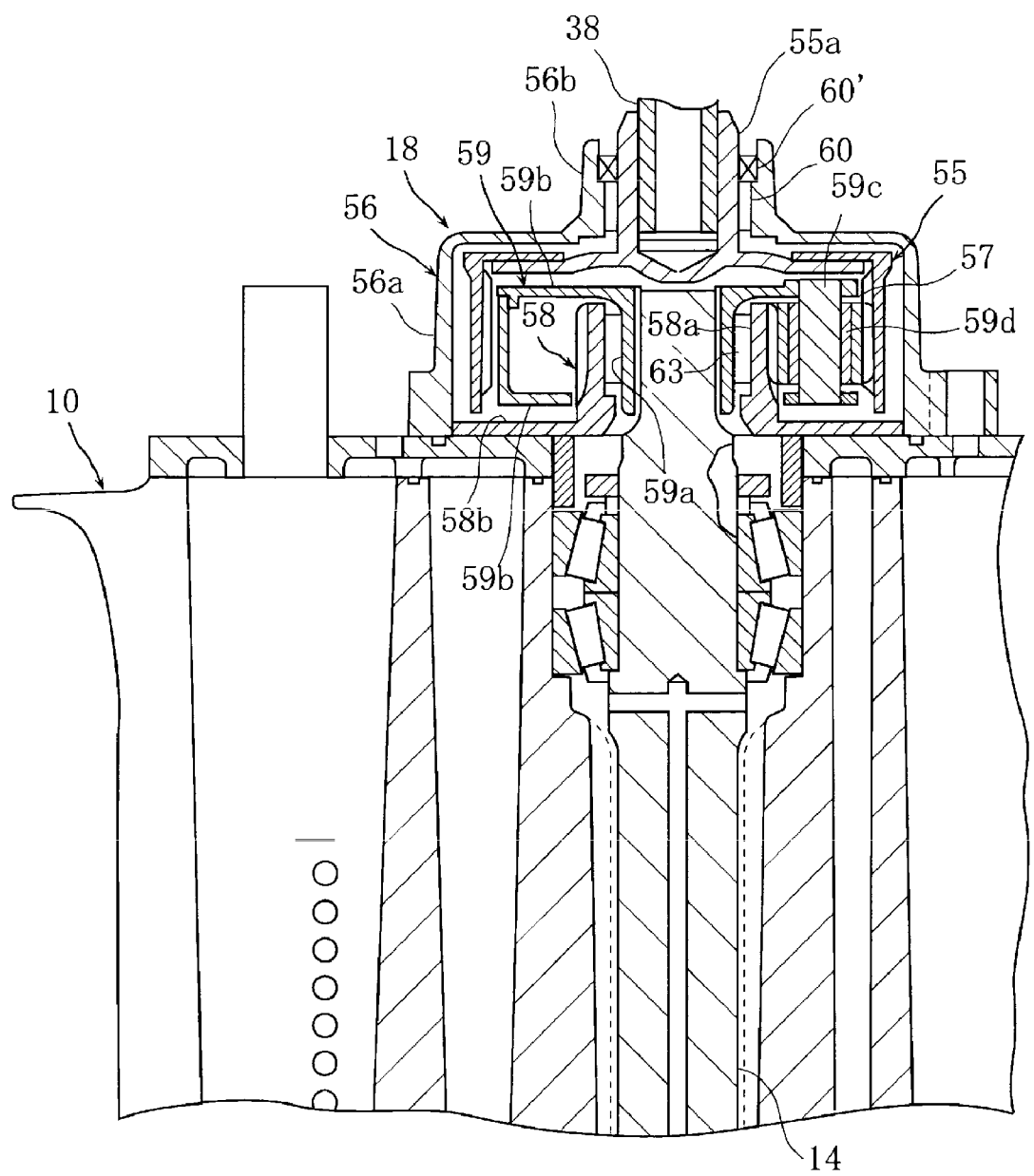
FIG. 4 is a cross-sectional view of a speed reduction mechanism connected with a lower case according to a preferred embodiment of the present invention.
Figure 5:
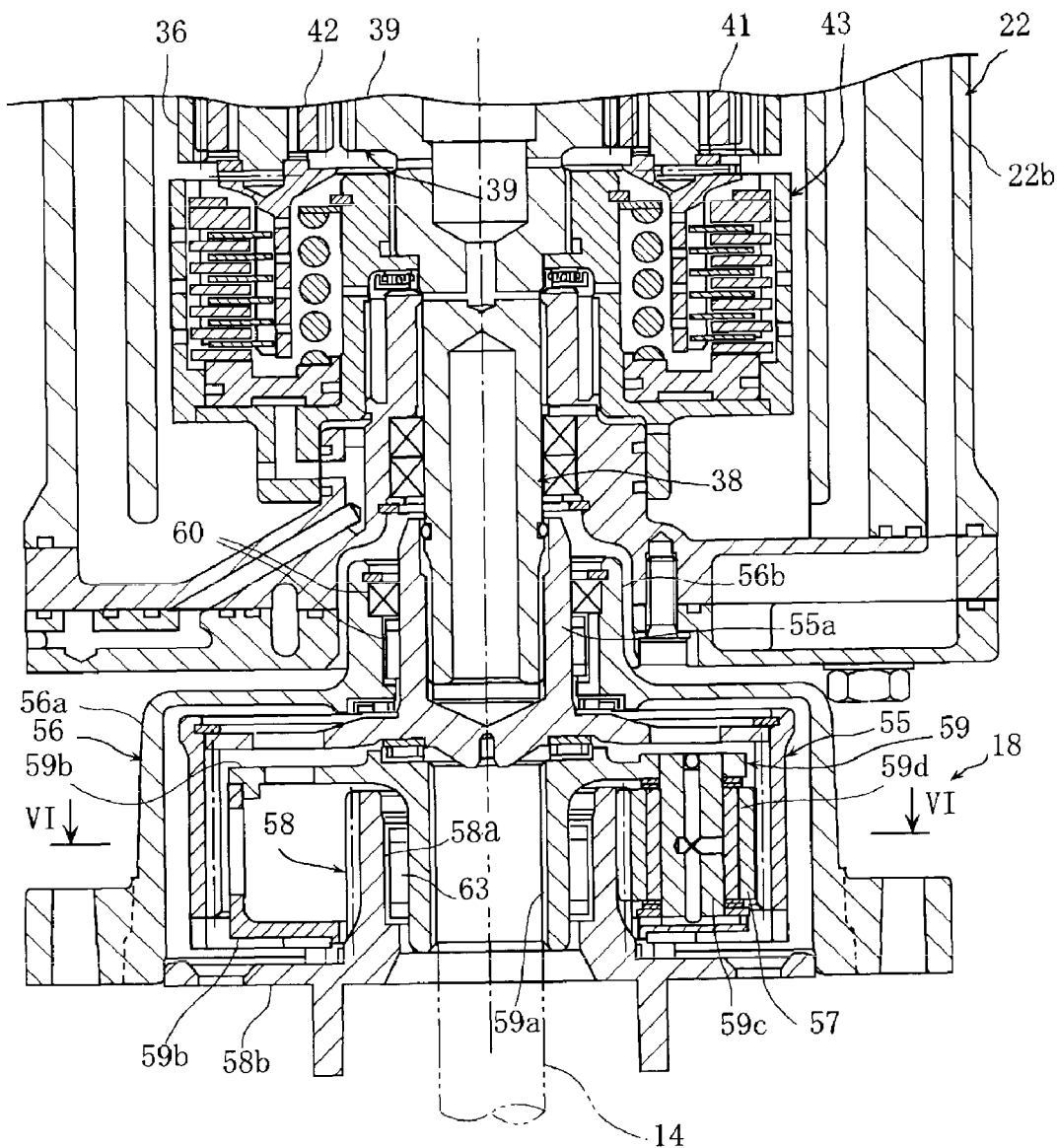
FIG. 5 is a cross-sectional view of a speed reduction mechanism according to a preferred embodiment of the present invention.
Figure 6:
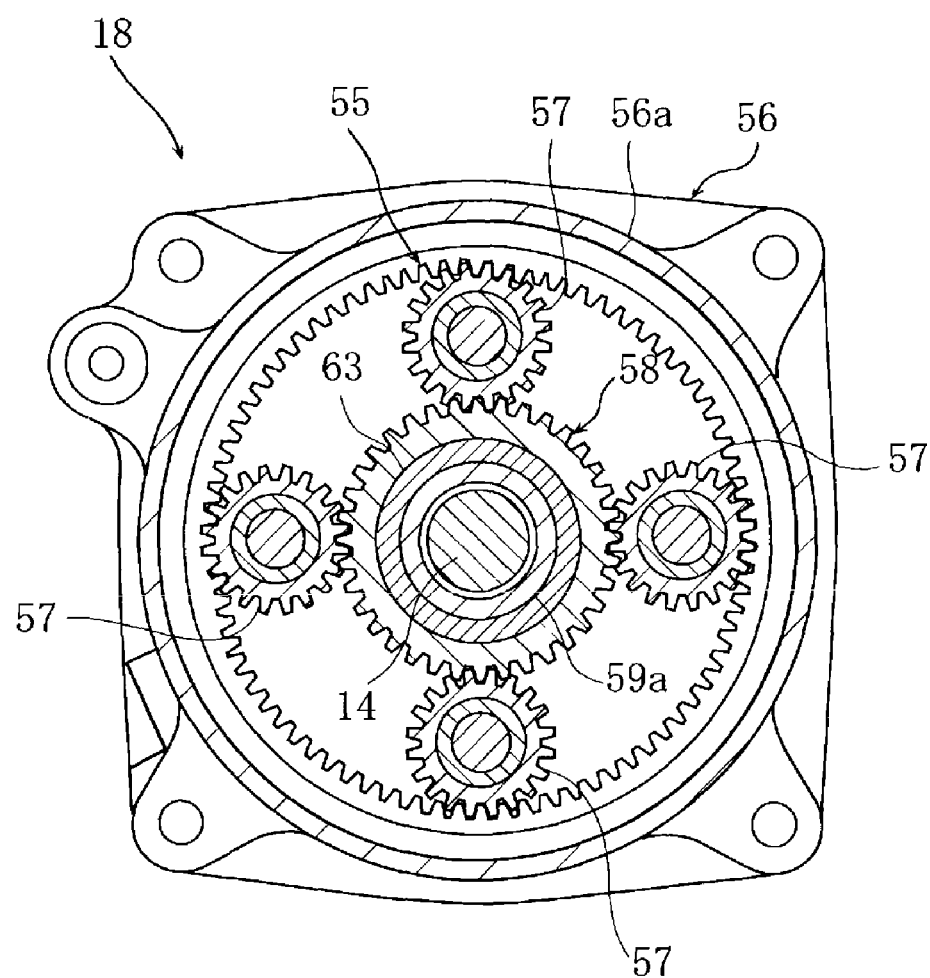
FIG. 6 is a cross-sectional view (cross-sectional view taken along a line VI-VI of FIG. 5) of the speed reduction mechanism.

FIG. 1 to FIG. 6 are views illustrating an outboard motor according to preferred embodiments of the present invention. Here, front, back, left, and right in the description of the preferred embodiments mean front, back, left, and right as seen from the back of a hull unless otherwise specified.

In the drawings, reference numeral 1 denotes an outboard motor mounted to a stern 2a of a hull 2. This outboard motor 1 is pivotally supported with a clamp bracket 3 fixed to the hull 2 through swivel arm 4 to vertically and horizontally swing and steerably supported to the left and right through a pivot portion 5.

The outboard motor 1 has an engine 6 that is located longitudinally such that crank shaft 6a is virtually vertical, an exhaust guide 7 to which the engine 6 is attached, a cowling 8 that is mounted and connected in the top plane of the exhaust guide 7 to cover the outer peripheral portion of the engine 6, an upper case 9 connected to the bottom plane of the exhaust guide 7, and a lower case 10 connected to the bottom plane of the upper case 9.

Further, the outboard motor 1 is supported by the clamp bracket 3 through an upper mount member 11 attached to the exhaust guide 7 and a lower mount member 12 attached to the lower end portion of the upper case 9.

The outboard motor 1 has the engine 6 that generates power and a speed change device 15 that changes the rotational speed of the engine 6 and transmits it to a propeller 13.

The speed change device 15 has a first input shaft 24 connected with a crank shaft 6a of the engine 6, a planetary gear speed change mechanism 20 connected to the first input shaft 24, a forward-and-reverse change mechanism 21 connected to the speed change mechanism 20, and a planetary gear speed reduction mechanism 18 connected to the forward-and-reverse change mechanism 21.

The propeller 13 is mounted to a propeller shaft 13a, and the propeller shaft 13a is connected to a drive shaft 14 through a bevel gear mechanism 13b. The propeller shaft 13a is disposed orthogonally to the crank shaft 6a in the lower case 10. The drive shaft 14 is located concentrically with the crank shaft 6a.

The speed change device 15 is accommodated in a housing 22 that is oil-tight and that preferably has a cylindrical or substantially cylindrical shape, and the housing 22 is arranged to be positioned in the front portion in the traveling direction within the upper case 9. At the back of the speed change device 15 in the upper case 9, an exhaust device 16 that discharges exhaust gas from the lower case 10 into water.

The housing 22 is divided into an upper housing 22a accommodating the speed change mechanism 20 and a lower housing 22b accommodating the forward-and-reverse change mechanism 21.

The planetary gear speed change mechanism 20 has a first inner gear 25, a first sun gear 27, a first output shaft 28, a first carrier 29, a first sun gear 30, and an interposed second clutch 31.

The first inner gear 25 is connected to rotate with the first input shaft 24. The first sun gear 27 is connected with the housing 22 side through a first clutch 26. The first output shaft 28 is located concentrically with the first input shaft 24. The first carrier 29 is connected so as to rotate with the first output shaft 28. The first planetary gear 30 is supported rotatably relative to the first carrier 29 and meshes with the first sun gear 27 and the first inner gear 25. The second clutch 31 is interposed between the first sun gear 27 and the first carrier 29.

The first input shaft 24 is located concentrically with the crank shaft 6a and is coupled so as to rotate with the crank shaft 6a.

The first sun gear 27 is accommodated and fixed or is supported rotatably inside the housing 22 and is connected or disconnected with a support housing 33 that supports the first output shaft 28 for rotation through the first clutch 26.

The first clutch 26 is a one-way clutch that allows rotation in the rotational direction of the crank shaft 6a of the first sun gear 27 (i.e., clockwise) and that prevents rotation in the opposite direction (i.e., counter clockwise).

The second clutch 31 is a wet multiple-plate clutch and has a clutch housing 31a, a plurality of clutch plates 31b, a piston 31e, and a spring member 31c.

The clutch housing 31a is coupled to rotate with the first sun gear 27. The clutch plate 31b is located between the clutch housing 31a and the first carrier 29. The piston 31e is located in a hydraulic chamber 31d provided in the clutch housing 31a and transmits power by pressing the clutch plates 31b by hydraulic pressure supplied to the hydraulic chamber 31d. The spring member 31c urges the piston 31e in the direction in which power is cut.

When a boat operator operates a shift lever or shift button (not shown) to activate the low speed range, the first clutch 26 is placed in the connected state, the first sun gear 27 is locked, and the second clutch 31 is placed in the disconnected state. In this state, rotation of the engine 6 is transmitted from the first input shaft 24 to the first inner gear 25. When the first inner gear 25 rotates, each planetary gear 30 rotates relative to the first inner gear 25 on its axis and revolves around the first sun gear 27. Through this arrangement, engine speed is reduced and transmitted to the first output shaft 28.

On the other hand, when the shift is operated to activate the high speed range, the first clutch 26 is placed in the disconnected state, the first sun gear 27 is set free, and the second clutch 31 is placed in the connected state.

In this state, when the rotation of the engine 6 is transmitted from the first input shaft 24 to the first inner gear 25, the first inner gear 25, each first planetary gear 30, and the first sun gear 27 rotate together, and the rotation of the first input shaft 24 is transmitted as is to the first output shaft 28.

The forward-and-reverse change mechanism 21 has a second inner gear 36, a second input shaft 37, a second output shaft 38, a second sun gear 39, a second carrier 40, a second planetary gear 41, a third planetary gear 42, and a fourth clutch 43.

The second inner gear 36 is connected with the housing 22 through a third clutch 35. The second input shaft 37 is located concentrically with the first output shaft 28 and is connected to rotate with the first output shaft 28. The second output shaft 38 is located concentrically with the second input shaft 37. The second sun gear 39 is connected and integral with the second output shaft 38. The second carrier 40 is connected to rotate with the second input shaft 37. The second planetary gear 41 is rotatably supported by the second carrier 40 and meshes with the second sun gear 39, and the third planetary gear 42 meshes with the second inner gear 36. The fourth clutch 43 is interposed between the second carrier 40 and the second output shaft 38.

The fourth clutch 43 and the third clutch 35 are preferably wet multiple-plate clutches having the same structure as the above-described second clutch 31.

When a forward-and-reverse change lever or a forward-and-reverse change button (not shown) is at a neutral position, the third and the fourth clutches 35 and 43 are placed in the disconnected state, the second input shaft 37 rotates idly, and the rotation of the second input shaft 37 is not transmitted to the second output shaft 38.

When the lever or the button is changed from the neutral position to the forward position, the third clutch 35 stays in the disconnected state, the fourth clutch 43 is placed in the connected state, the second inner gear 36, the second and the third planetary gears 41 and 42, and the second sun gear 39 rotate together, and the second output shaft 38 rotates in the same forward direction as the rotational direction of the engine 6.

On the other hand, when the lever or the button is changed from the neutral position to the reverse position, the third clutch 35 is placed in the connected state, the fourth clutch 43 stays in the disconnected state, the second inner gear 36 is fixed non-rotatably to the housing 22, the second and the third planetary gears 41 and 42 revolves while rotating on its axis in the opposite direction from each other, and the second sun gear 36 rotates in the opposite direction. As a result of this unique arrangement, the second output shaft 38 rotates in the opposite direction to the rotational direction of the crank shaft 6*a*.

The first input shaft 24 is provided with an oil pump 45 and is connected with a water pump 50 through a drive force extraction shaft 46*a* so as to face the direction perpendicular or substantially perpendicular to the crossing crank shaft 6*a*.

On the stroke side in the beam direction of the housing 22, hydraulic control valves 65 to 67 that control hydraulic pressures supplied to the clutches 31, 35 and 43 are arranged in parallel or substantially parallel in the direction of the crank shaft 6*a*. These hydraulic control valves 65 to 67 are controlled by a controller (not shown) to open and close according to shift change signals and forward-and-reverse change signals.

The planetary gear speed reduction mechanism 18 is configured to reduce the rotational speed of the second output shaft 38 and transmit to the drive shaft 14 and, more specifically, has the following structure.

Here, when seen from the speed reduction mechanism 18 side, the second output shaft 38 is an input shaft to which the engine power is input, and the drive shaft 14 is an output shaft from which the engine power is output.

The speed reduction mechanism 18 has an inner gear 55 connected with the second output shaft 38, four planetary gears 57 that mesh with the inner gear 55 and that roll inside the inner gear 55, and a sun gear 58 that meshes with each planetary gear 57 and that is not rotatable.

The speed reduction mechanism 18 is accommodated in a speed reduction housing 56. The speed reduction housing 56 is fixed with bolts, for example, in the top plane of the lower case 10 and has a housing body 56*a* of a generally large bowl shape opening downward and a housing boss portion 56*b* having a cylindrical or substantially cylindrical shape arranged to extend into the housing 22 continuing from the housing body 56*a*.

The inner gear 55 has an inner gear boss portion 55*a* having a cylindrical or substantially cylindrical shape extending in the direction of the crank shaft, and the inner gear boss portion 55*a* is inserted to overlap with the inside of the housing boss portion 56*b*. The inner gear boss portion 55*a* is rotatably supported by the housing boss portion 56*b* through a bearing 60. Further, reference numeral 60' denotes an oil seal.

Inside the inner gear boss portion 55*a*, the second output shaft 38 is coupled by spline-fitting to be concentrically arranged, so that the inner gear 55 rotates with the second output shaft 38.

Each planetary gear 57 is rotatably supported by a carrier 59. The carrier 59 is accommodated and located inside the inner gear 55 to overlap in the direction perpendicular or substantially perpendicular to the shaft.

The carrier 59 has a shaft portion 59*a* preferably having a cylindrical or substantially cylindrical shape that is concentric with the second output shaft 38 and that has a hole vertically passing through a shaft core portion, upper and lower carrier bodies 59*b* that extend in the upper and lower rim portions of shaft portion 59 to the outside of the radial direction, and four carrier shafts 59*c* attached to the upper and lower carrier bodies 59*b*. Each planetary gear 57 is supported rotatably relative to each other by each carrier shaft 59*c* through the bearing 59*d*.

The sun gear 58 has a shaft portion 58*a* preferably having a cylindrical or substantially cylindrical shape in which external peripheral teeth are arranged to mesh with each planetary gear 57 and a flange portion 58*b* having a circular or substantially circular disk shape extending from the lower end portion of the shaft portion 58*a* to the outside of the radial direction. The flange portion 58*b* is fixed with bolts, for example, in the top plane of the lower case 10.

The shaft portion 59*a* of the carrier 59 is inserted in the shaft portion 58*a* of the sun gear 58 to overlap in the direction perpendicular or substantially perpendicular to the shaft with the shaft portion 58*a* and is rotatably supported by the shaft portion 58*a* relative to the shaft portion 58*a* through the bearing 63.

Inside the shaft portion 59*a* of the carrier 59, the drive shaft 14 is inserted from the lower side so as to be concentrically arranged with the shaft portion 59*a*, and the drive shaft 14 is coupled to the shaft portion 59*a* by spline-fitting, for example. The upper end portion of this drive shaft 14 is positioned in the upper end portion of the shaft portion 59*a* of the carrier 59 to mutually overlap in the direction perpendicular or substantially perpendicular to the shaft.

The shaft portion 59*a* of the carrier 59 preferably has a cylindrical or substantially cylindrical shape having a hole passing vertically therethrough, so that it is possible to insert the drive shaft 14 up to the upper end plane of the shaft portion 59*a* and improve workability for providing a female spline groove in the inner peripheral plane of the shaft 59*a*.

The sun gear 58 rotatably supports the carrier 59 and the drive shaft 14 and, when seen from the direction perpendicular or substantially perpendicular to the shaft, the shaft portion 59*a* of the carrier 59, each planetary gear 57, and the inner gear 55 overlap with the shaft portion 58*a* of the sun gear 58.

According to the present preferred embodiment, the shaft portion 59*a* of the carrier 59 and the shaft portion 58*a* of the sun gear 58 configuring the speed reduction mechanism 18 preferably have a cylindrical or substantially cylindrical shape, the shaft portion 59*a* of the carrier 59 is inserted to overlap with the shaft portion 58*a* of the sun gear 58 in the direction perpendicular or substantially perpendicular to the shaft, and the upper end portion of the drive shaft 14 is further inserted in the shaft portion 59*a* of the carrier 59. Therefore, it is possible to shorten the length h of the entire speed reduction mechanism 18 in the axial direction (see FIG. 2) and prevent the size of the outboard motor from increasing when the speed reduction mechanism 18 is added to the speed change device 15.

With this preferred embodiment, the drive shaft 14 is inserted in the shaft portion 59*a* of the carrier 59, and the drive shaft 14 is coupled by spline-fitting to be concentrically arranged with the shaft portion 59*a*, so that it is possible to prevent the radius of the drive shaft 14 from increasing more than necessary and reduce the size of the power transmission mechanism of the propeller 13, accordingly. That is, if the structure arranged to fit and mount the drive shaft 14 to the outer periphery of the shaft portion 59*a* of the carrier 59 is employed, the radius of the drive shaft 14 increases accordingly, and the length in the shaft direction increases.

With this preferred embodiment, the shaft portion 59*a* of the carrier 59 and the drive shaft 14 are rotatably supported by the sun gear 58, so that it is possible to further shorten the length of the speed reduction mechanism 18 in the axial direction.

Further, the speed reduction mechanism 18 is located at the output end of the speed change mechanism 20 and the forward-and-reverse change mechanism 21, so that speed is reduced in the downstream at the lowest reach of the transmission system arranged to transmit engine power to the propeller and, consequently, make the radius of the shaft positioned in the upstream smaller.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An outboard motor comprising:
    an engine arranged to generate power; and
    a speed change device arranged to change a rotational speed of the engine and transmit power to a propeller; wherein
    the speed change device has a speed reduction mechanism that is arranged to reduce a rotational speed of an input shaft and transmit to an output shaft, the speed reduction mechanism including:
        an inner gear that is connected with the input shaft;
        a planetary gear arranged to mesh with the inner gear and that rolls inside the inner gear; and
        a sun gear arranged to mesh with the planetary gear and that is not rotatable;
    a shaft portion of a carrier arranged to support the planetary gear and a shaft portion of the sun gear have a cylindrical or substantially cylindrical shape;
    the shaft portion of the carrier is inserted and located to overlap with the shaft portion of the sun gear; and
    the output shaft is inserted and coupled to the shaft portion of the carrier.

2. The outboard motor according to claim 1, wherein
    the speed change device has a speed change mechanism and a forward-and-reverse change mechanism; and
    the speed reduction mechanism is located closer to a propeller shaft than both the speed change mechanism and the forward-and-reverse change mechanism and closer to an engine than a bevel mechanism that couples the propeller shaft to the output shaft.

3. The outboard motor according to claim 1, wherein the shaft portion of the carrier and the output shaft are coupled by spline-fitting to be concentrically arranged.

4. The outboard motor according to claim 1, wherein the sun gear supports the shaft of the carrier and the output shaft through a bearing that permits rotation.

* * * * *